(12) United States Patent
Taniguchi et al.

(10) Patent No.: US 12,445,074 B2
(45) Date of Patent: Oct. 14, 2025

(54) SYNCHRONOUS MACHINE CONTROL DEVICE, SYNCHRONOUS MACHINE CONTROL METHOD, AND ELECTRIC VEHICLE

(71) Applicant: Hitachi Astemo, Ltd., Hitachinaka (JP)

(72) Inventors: Shun Taniguchi, Tokyo (JP); Noriya Nakao, Tokyo (JP); Kazuaki Tobari, Tokyo (JP); Toshiyuki Ajima, Tokyo (JP); Kentaro Matsuo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 150 days.

(21) Appl. No.: 18/281,731

(22) PCT Filed: Aug. 31, 2021

(86) PCT No.: PCT/JP2021/031848
§ 371 (c)(1),
(2) Date: Sep. 12, 2023

(87) PCT Pub. No.: WO2022/195918
PCT Pub. Date: Sep. 22, 2022

(65) Prior Publication Data
US 2024/0171107 A1    May 23, 2024

(30) Foreign Application Priority Data

Mar. 18, 2021    (JP) .................... 2021-044902

(51) Int. Cl.
*H02P 21/10*    (2016.01)
*H02P 21/05*    (2006.01)
(Continued)

(52) U.S. Cl.
CPC .......... *H02P 25/024* (2016.02); *H02P 21/141* (2013.01); *H02P 21/22* (2016.02); *H02P 27/08* (2013.01)

(58) Field of Classification Search
CPC ........ H02P 21/141; H02P 21/22; H02P 27/08; H02P 21/05; H02P 25/024; H02P 21/10
(Continued)

(56) References Cited

U.S. PATENT DOCUMENTS 6,014,006 A * 1/2000 Stuntz .................. H02P 21/18
318/811
10,171,019 B1 * 1/2019 Xu ..................... H02P 21/141
(Continued)

FOREIGN PATENT DOCUMENTS

EP    2 963 804 B1    6/2019
JP    11-89277 A    3/1999
(Continued)

OTHER PUBLICATIONS

International Search Report (PCT/ISA/210) issued in PCT Application No. PCT/JP2021/031848 dated Nov. 22, 2021 with English translation (4 pages).

(Continued)

*Primary Examiner* — Gabriel Agared
(74) *Attorney, Agent, or Firm* — Crowell & Moring LLP

(57) ABSTRACT

Disclosed is a synchronous machine control device capable of suitably executing stabilization control of a synchronous machine. This synchronous machine control device controls a power converter (2) to which a synchronous machine (1) is connected, and comprises: a first magnetic flux command calculation unit (21) that calculates a first magnetic flux command value from an electric current command value of the synchronous machine; a magnetic flux estimation unit (23) that estimates a magnetic flux value of the synchronous machine from an electric current detection value of the synchronous machine; a voltage calculation unit (19) that generates a voltage command value for the power converter such that the first magnetic flux command value and the (Continued)

magnetic flux value match; and a damping ratio control unit (27) that, on the basis of a vibration component of the magnetic flux value, generates a correction amount for the voltage command value such that the vibration component is damped.

14 Claims, 15 Drawing Sheets

(51) Int. Cl.
   *H02P 21/14* (2016.01)
   *H02P 21/22* (2016.01)
   *H02P 25/024* (2016.01)
   *H02P 27/08* (2006.01)

(58) Field of Classification Search
   USPC .......................................................... 318/723
   See application file for complete search history.

(56) References Cited

U.S. PATENT DOCUMENTS

| | | | | |
|---|---|---|---|---|
| 2003/0146723 | A1* | 8/2003 | Pavlov | H02P 21/18 318/432 |
| 2011/0285337 | A1* | 11/2011 | Taniguchi | H02P 21/24 318/400.34 |
| 2014/0042953 | A1* | 2/2014 | Sul | B60L 15/007 318/718 |
| 2022/0103102 | A1 | 3/2022 | Kezobo et al. | |
| 2023/0155529 | A1* | 5/2023 | Taniguchi | B60L 15/20 318/400.02 |

FOREIGN PATENT DOCUMENTS

| | | |
|---|---|---|
| JP | 4797074 B2 | 10/2011 |
| JP | 5948266 B2 | 7/2016 |
| JP | 2016-149822 A | 8/2016 |
| JP | 2020-178439 A | 10/2020 |
| WO | WO 2021/186842 A1 | 9/2021 |

OTHER PUBLICATIONS

Japanese-language Written Opinion (PCT/ISA/237) issued in PCT Application No. PCT/JP2021/031848 dated Nov. 22, 2021 with English translation (9 pages).

International Preliminary Report on Patentability (PCT/IB/338 & PCT/IB/373) issued in PCT Application No. PCT/JP2021/031848 dated Sep. 28, 2023, including English translation of document C2 (Japanese-language Written Opinion (PCT/ISA/237), filed on Sep. 12, 2023) (7 pages).

Japanese-language Office Action issued in Japanese Application No. 2021-044902 dated Dec. 5, 2023 with English translation (5 pages).

* cited by examiner

SYNCHRONOUS MACHINE CONTROL DEVICE, SYNCHRONOUS MACHINE CONTROL METHOD, AND ELECTRIC VEHICLE

TECHNICAL FIELD

The present invention relates to a synchronous machine control device and a synchronous machine control method for driving a synchronous machine such as a synchronous motor, and an electric vehicle using the same.

BACKGROUND ART

In order to miniaturize a synchronous motor, high-speed rotation and high magnetic flux density of the motor have been advanced. In particular, in an electric vehicle such as an electric automobile, since a weight of a motor affects a power consumption amount, the tendency is remarkable.

In order to cope with high-speed rotation, stabilization control for stably driving the motor is required.

As a conventional technique related to stabilization control, techniques disclosed in PTL 1 and PTL 2 are known.

In the technique disclosed in PTL 1, a gain of the current control with respect to a resonance frequency of a motor is reduced by controlling a voltage in a reverse direction on the basis of a vibration component of a current detection value.

In the technique disclosed in PTL 2, gain characteristics with respect to a resonance frequency of a motor are controlled by controlling a rotation phase angle on the basis of a vibration component of a current detection value.

CITATION LIST

Patent Literature

PTL 1: Japanese Patent No. 5948266
PTL 2: Japanese Patent No. 4797074

SUMMARY OF INVENTION

Technical Problem

In the technique disclosed in PTL 1, since a voltage is controlled according to a current, a current value is multiplied by the inductance in control calculation. Although the inductance considered here corresponds to a dynamic inductance, the dynamic inductance changes due to magnetic saturation. It is difficult to adapt a control parameter to the dynamic inductance. Therefore, it is difficult to accurately perform stabilization control.

In the technique disclosed in PTL 2, since a relationship between a current and a rotation phase angle is not unique, the stabilization control may not work properly depending on a torque or a speed.

Therefore, in these conventional techniques, in a case where a first-order resistance of a motor is small and a variation range of a torque and a speed is wide, as in automobile applications, the stabilization control may not operate properly.

Therefore, the present invention provides a synchronous machine control device and a synchronous machine control method capable of appropriately executing stabilization control of a synchronous machine, and an electric vehicle equipped with the synchronous machine controlled by the synchronous machine control device.

Solution to Problem

In order to solve the above problem, a synchronous machine control device according to the present invention controls a power converter to which a synchronous machine is connected, and includes a first magnetic flux command calculation unit that calculates a first magnetic flux command value from a current command value of the synchronous machine, a magnetic flux estimation unit that estimates a magnetic flux value of the synchronous machine from a current detection value of the synchronous machine, a voltage calculation unit that creates a voltage command value of the power converter so that the first magnetic flux command value matches the magnetic flux value, and a damping ratio control unit that creates a correction amount of the voltage command value so that a vibration component of the magnetic flux value attenuates on the basis of the vibration component.

In order to solve the above problems, a synchronous machine control method according to the present invention is a method for controlling a power converter to which a synchronous machine is connected, the method including: calculating a first magnetic flux command value from a current command value of the synchronous machine; estimating a magnetic flux value of the synchronous machine from a current detection value of the synchronous machine; creating a voltage command value of the power converter so that the first magnetic flux command value and the magnetic flux value match; and creating a correction amount of the voltage command value so that a vibration component of the magnetic flux value attenuates, on the basis of the vibration component.

In order to solve the above problems, an electric vehicle according to the present invention is driven by a synchronous machine, and includes a power converter that is connected to the synchronous machine and supplies power to the synchronous machine, and a synchronous machine control device that controls the power converter. The synchronous machine control device is the synchronous machine control device according to the present invention.

Advantageous Effects of Invention

According to the present invention, it is possible to realize a current control system capable of appropriately controlling a damping ratio regardless of a torque or a speed.

Problems, configurations, and effects other than those described above will be clarified by the following description of embodiments.

DESCRIPTION OF EMBODIMENTS

Figure 1:
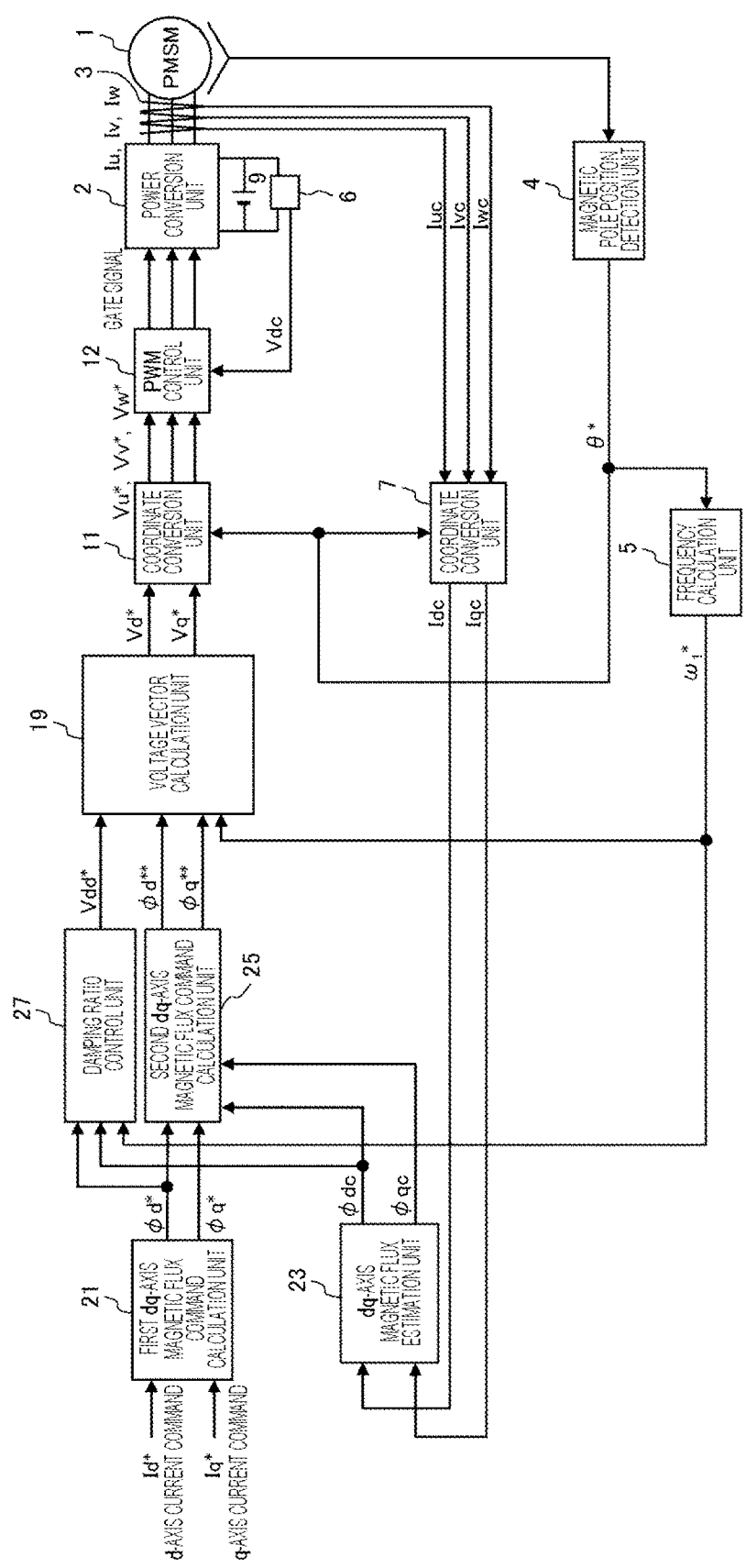
FIG. 1 is a functional block diagram illustrating a configuration of a synchronous machine control device according to Example 1.

Hereinafter, an embodiment of the present invention will be described according to the following Examples 1 to 5 with reference to the drawings. In the drawings, the same reference numerals indicate the same constituent or constituents having similar functions.

In each example, a synchronous machine that is a control target is a permanent magnet synchronous motor (hereinafter, referred to as a "PMSM").

Example 1

FIG. 1 is a functional block diagram illustrating a configuration of a synchronous machine control device according to Example 1 of the present invention. In the present example, a computer system such as a microcomputer executes a predetermined program to function as the synchronous machine control device illustrated in FIG. 1 (the same applies to other examples).

In FIG. 1, a PMSM 1 and a DC voltage source 9 (for example, a battery) are connected to an AC side and a DC side of a power converter 2, respectively. The power converter 2 converts DC power from the DC voltage source 9 into AC power and outputs the AC power to the PMSM 1. The PMSM 1 is rotationally driven by the AC power. The power converter 2 includes an inverter main circuit including a semiconductor switching element. The semiconductor switching element is controlled to be turned on and off by a gate signal, and thus the DC power is converted into the AC power. As the semiconductor switching element, for example, an insulated gate bipolar transistor (IGBT) is applied.

A phase current detector 3 detects three-phase motor currents flowing from the power converter 2 to the PMSM 1, that is, a U-phase current Iu, a V-phase current Iv, and a W-phase current Iw, and outputs the three-phase motor currents as a U-phase current detection value Iuc, a V-phase current detection value Ivc, and a W-phase current detection value Iwc, respectively. As the phase current detector 3, a Hall current transformer (CT) or the like is applied.

A magnetic pole position detector 4 detects a magnetic pole position of the PMSM 1 and outputs magnetic pole position information $\theta^*$. A resolver or the like is applied as the magnetic pole position detector 4.

A frequency calculation unit 5 calculates speed information $\omega_1^*$ from the magnetic pole position information $\theta^*$ output from the magnetic pole position detector 4 through time differentiation calculation or the like, and outputs the speed information $\omega_1^*$.

A coordinate conversion unit 7 converts Iuc, Ivc, and Iwc output from the phase current detector into dq-axis current detection values Idc and Iqc in the rotating coordinate system according to the magnetic pole position information $\theta^*$, and outputs Idc and Iqc.

A dq-axis magnetic flux estimation unit 23 refers to a lookup table (table data) on the basis of the dq-axis current detection values Idc and Iqc output from the coordinate conversion unit 7 to estimate dq-axis magnetic flux estimation values $\varphi dc$ and $\varphi qc$. The lookup table (table data) referred to by the dq-axis magnetic flux estimation unit 23 is table data representing a correspondence between Idc and Iqc and $\varphi dc$ and $\varphi qc$, and is stored in a storage device (not illustrated) included in the synchronous machine control device of the present example. Note that a predetermined function (approximate expression or the like) may be used instead of the lookup table.

A first dq-axis magnetic flux command calculation unit 21 calculates and outputs first dq-axis magnetic flux command values $\varphi d^*$ and $\varphi q^*$ by referring to a lookup table (table data) on the basis of the dq-axis current command values Idc* and Iqc* provided from a host control device or the like. The lookup table (table data) referred to by the first dq-axis magnetic flux command calculation unit 21 is table data representing a correspondence between Idc* and Iqc* and $\varphi d^*$ and $\varphi q^*$, and is stored in a storage device (not illustrated) included in the synchronous machine control device of the present example. Note that a predetermined function (approximate expression or the like) may be used instead of the lookup table.

The second dq-axis magnetic flux command calculation unit 25 calculates and outputs second dq-axis magnetic flux command values $\varphi d^{}$ and $\varphi q^{}$ by using a proportional integral (PI) controller such that the first dq-axis magnetic flux command values $\varphi d^*$ and $\varphi q^*$ and the dq-axis magnetic flux estimation values $\varphi dc$ and $\varphi qc$ match each other.

Figure 2:
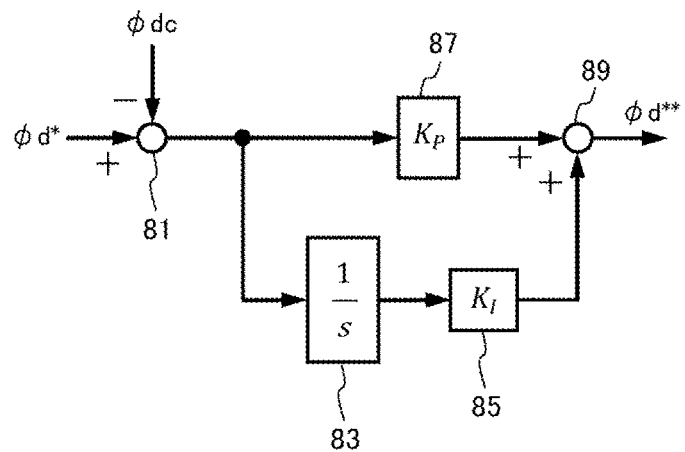
FIG. 2 is a functional block diagram illustrating a configuration of a PI controller in a second dq-axis magnetic flux command calculation unit 25 (FIG. 1).
Figure 2:
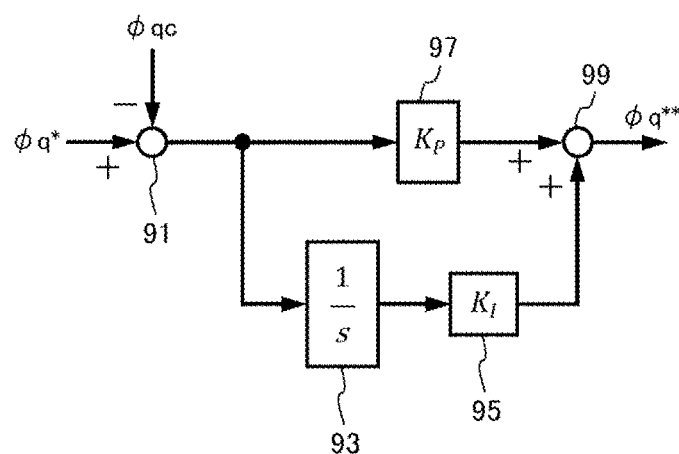

FIG. 2 is a functional block diagram illustrating a configuration of a PI controller in the second dq-axis magnetic flux command calculation unit 25 (FIG. 1).

As illustrated in the upper part of FIG. 2, in the PI controller that calculates the second d-axis magnetic flux command value $\varphi d^{**}$, an adder-subtractor 81 calculates a difference ($\varphi d^* - \varphi dc$) between the first d-axis magnetic flux command value φd* and the d-axis magnetic flux estimation value φdc, and a proportioner 87 multiplies the difference calculation value by a proportional gain ($K_P$). The difference calculation value is integrated by an integrator 83, and an integral value is multiplied by an integral gain ($K_I$) by the proportioner 85. An adder 89 adds the difference calculation value multiplied by the proportional gain $K_P$ and the integral value multiplied by the integral gain $K_I$ to calculate the second d-axis magnetic flux command value φd**.

As illustrated in the lower part of FIG. 2, in the PI controller that calculates the second q-axis magnetic flux command value φq, an adder-subtractor 91** calculates a difference (φq'–φqc) between the first q-axis magnetic flux command value φq* and the q-axis magnetic flux estimation value φqc, and a proportioner 97 multiplies the difference calculation value by a proportional gain ($K_P$). The difference calculation value is integrated by an integrator 93, and the integral value is multiplied by an integral gain ($K_I$) by the proportioner 95. The adder 99 adds the difference calculation value multiplied by the proportional gain $K_P$ and the integral value multiplied by the integral gain $K_I$ to calculate the second q-axis magnetic flux command value φq**.

The damping ratio control unit 27 illustrated in FIG. 1 extracts a vibration component of the motor magnetic flux, and creates a voltage command value (hereinafter, referred to as a "stabilization voltage command value") for damping the vibration component according to the extracted vibration component. In the present example, as illustrated in FIG. 1, the damping ratio control unit 27 extracts a vibration component of the d-axis magnetic flux on the basis of the first d-axis magnetic flux command value φd* and the d-axis magnetic flux estimation value φdc, and creates a d-axis stabilization voltage command value Vdd* for damping the vibration component according to the extracted vibration component.

A value of the damping ratio in the response (a current or the like) of the motor to the voltage command is usually set by a motor constant (a resistance of an armature winding, an inductance of the armature winding, or the like), and is difficult to control. In contrast, in Example 1, such a damping ratio is equivalently controlled by the damping ratio control unit 27 to suppress vibration of the response.

Figure 3:
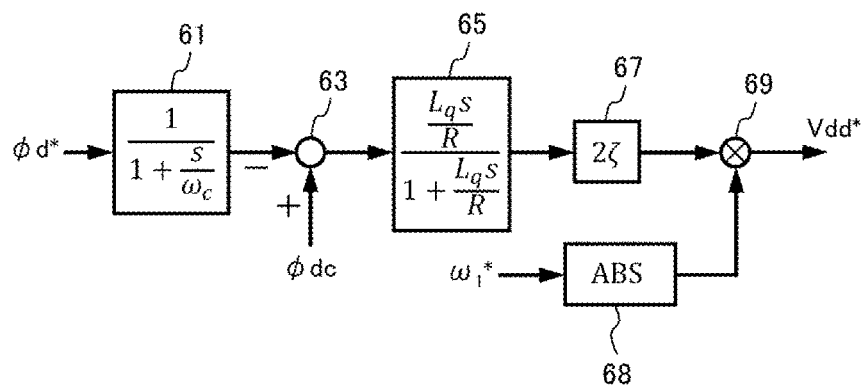
FIG. 3 is a functional block diagram illustrating a configuration of a damping ratio control unit 27 (FIG. 1).

FIG. 3 is a functional block diagram illustrating a configuration of the damping ratio control unit 27 (FIG. 1).

As illustrated in FIG. 3, in the damping ratio control unit 27, a first-order lag of the first d-axis magnetic flux command φd* is calculated by a first-order lag calculator 61. In Example 1, a reciprocal of a cutoff angular frequency ωc of the control system is a time constant at the first-order lag.

A difference between the d-axis magnetic flux estimation value φdc and the first-order lag of the first d-axis magnetic flux command φd* (φdc−(first-order lag of φd*)) is calculated by the adder-subtractor 63. The vibration component of the difference calculation value is extracted by a high-pass filter 65 (a transfer function is illustrated in FIG. 3). The extracted vibration component is multiplied by a gain (2ζ) by the proportioner 67.

Here, ζ is a control parameter related to the degree of damping of the vibration component. That is, ζ corresponds to a damping ratio in the response of the motor, but is a constant that is freely set (where 0<ζ≤1) independently of the damping ratio in the response of the motor in the control system. Therefore, hereinafter, ζ is referred to as a "damping ratio".

As illustrated in FIG. 3, an absolute value of speed information $ω_1$* of the PMSM 1 (FIG. 1) is multiplied in the multiplier 69 by the vibration component of the d-axis magnetic flux that is multiplied by a gain (2ζ). As a result, the magnetic flux value is converted into a voltage value, and the d-axis stabilizing voltage command value Vdd* is created. The absolute value of the speed information $ω_1$* is calculated by an absolute value calculator 68 (ABS).

The voltage vector calculation unit 19 illustrated in FIG. 1 creates a voltage command value by using an inverse model of a motor model in which the magnetic flux of the motor is a state quantity.

The inverse model of the motor model is expressed by, for example, a voltage equation as in Equation (1), where the d-axis magnetic flux and the q-axis magnetic flux of the motor are φd and φq, respectively, the d-axis voltage and the q-axis voltage of the motor are Vd and Vq, respectively, and the motor speed is $ω_1$.

[Math. 1]

$$\begin{bmatrix} V_d \\ V_q \end{bmatrix} = \begin{bmatrix} \frac{R}{L_d} & 0 \\ 0 & \frac{R}{L_q} \end{bmatrix} \begin{bmatrix} \phi_d - K_e \\ \phi_q \end{bmatrix} + s\begin{bmatrix} \phi_d \\ \phi_q \end{bmatrix} + \omega_1 \begin{bmatrix} 0 & -1 \\ 1 & 0 \end{bmatrix}\begin{bmatrix} \phi_d \\ \phi_q \end{bmatrix} \quad (1)$$

In Example 1, the inverse model expressed by the Equation (1) is applied, but φd and φq are the second d-axis magnetic flux command value φd and the second q-axis magnetic flux command value φq, respectively, and ω1 is the speed information $ω_1$*. The voltage vector calculation unit 19 creates and outputs the d-axis voltage command value Vd* on the basis of Vd calculated by using Equation (1) and the d-axis stabilization voltage command value Vdd* output by the damping ratio control unit 27. The voltage vector calculation unit 19 outputs Vq calculated by using Equation (1) as the q-axis voltage command value Vq*.

Next, as will be described, in Equation (1), the magnetic saturation of the motor is considered.

In a case where magnetic fluxes (dq-axis magnetic fluxes φd and φq) are used as state quantities, the voltage equation is expressed as Equation (2) in consideration of magnetic saturation.

[Math. 2]

$$\begin{bmatrix} V_d \\ V_q \end{bmatrix} = \frac{R}{L_d L_q - L_{dq} L_{qd}}\begin{bmatrix} L_q & -L_{qd} \\ -L_{dq} & L_d \end{bmatrix}\begin{bmatrix} \phi_d - K_e \\ \phi_q \end{bmatrix} + s\begin{bmatrix} \phi_d \\ \phi_q \end{bmatrix} + \omega\begin{bmatrix} 0 & -1 \\ 1 & 0 \end{bmatrix}\begin{bmatrix} \phi_d \\ \phi_q \end{bmatrix} \quad (2)$$

In many high-efficiency PMSMs, such as for automobiles, a winding resistance R is sufficiently small, so that the influence of the first term of Equation (2) in motor control is relatively small. Therefore, even if Ld, Lq, and Ke are set as constant values through approximation as in Equation (1), the influence on the motor control is small. Therefore, the voltage vector calculation unit 19 according to Example 1 creates a voltage command by using the above-described Equation (1).

As in the Equations (1) and (2), by using the magnetic flux (dq-axis magnetic flux) as a state quantity, the number of inductance values (dq-axis inductances (including dynamic inductance and static inductance)) used in the voltage equation is reduced compared with a case where a current (dq-axis current) is used as a state quantity (considering magnetic saturation). As a result, since the control system is simplified while considering magnetic saturation, a calculation load on the synchronous machine control device can be reduced, and a parameter identification time can be reduced.

In Example 1, the dq-axis voltage command values Vd* and Vq* are created on the basis of the second dq-axis magnetic flux command values φd and φq created by the second dq-axis magnetic flux command calculation unit 25. Therefore, also in the high-speed region, the d-axis magnetic flux estimation value φdc and the q-axis magnetic flux estimation value φqc can be accurately matched with the second d-axis magnetic flux command value φd and the second q-axis magnetic flux command value φq, respectively. Therefore, according to the synchronous machine control device of Example 1, it is possible to control the high-speed rotation of the PMSM 1.

In Example 1, the influence of the temperature dependence of the magnetic flux is alleviated by the PI controller or the I controller included in the second dq-axis magnetic flux command calculation unit 25. Therefore, the table data or the function used for the calculation of the magnetic flux (φd, φq) may be table data or a function (approximate expression or the like) in which a temperature is not included as a variable and only a current is used as a variable. As a result, the calculation load on the synchronous machine control device can be reduced, and a parameter identification time can be reduced.

By using the same table data or function in the first dq-axis magnetic flux command calculation unit 21 and the dq-axis magnetic flux estimation unit 23, Idc and Iqc are controlled to match Id* and Iq*, respectively, via the magnetic fluxes. In this case, a current control system is substantially configured.

Each of the first dq-axis magnetic flux command calculation unit 21 and the dq-axis magnetic flux estimation unit 23 uses independent table data or functions, thereby enabling control in consideration of mutual interference between axes. In this case, each of the first dq-axis magnetic flux command calculation unit 21 and the dq-axis magnetic flux estimation unit 23 uses table data or a function representing a correspondence relationship between the dq-axis magnetic flux command value (φd*, φq*) and the dq-axis current command value (Id*, Iq*), and table data or a function representing a correspondence relationship between the dq-axis magnetic flux estimation value (φdc, φqc) and the dq-axis current detection value (Idc, Iqc).

Since the synchronous machine control device of Example 1 substantially considers the dynamic inductance and the static inductance of the motor, the synchronous machine control device is suitable for application to an electric vehicle such as an electric automobile in which a PMSM having a large influence of magnetic saturation is used and an accurate torque response is required.

Note that the above-described lookup table, table data, and function (approximate expression), which are information indicating a correspondence relationship between a magnetic flux and a current in the PMSM 1, can be set on the basis of actual measurement, magnetic field analysis, or the like.

Figure 4:
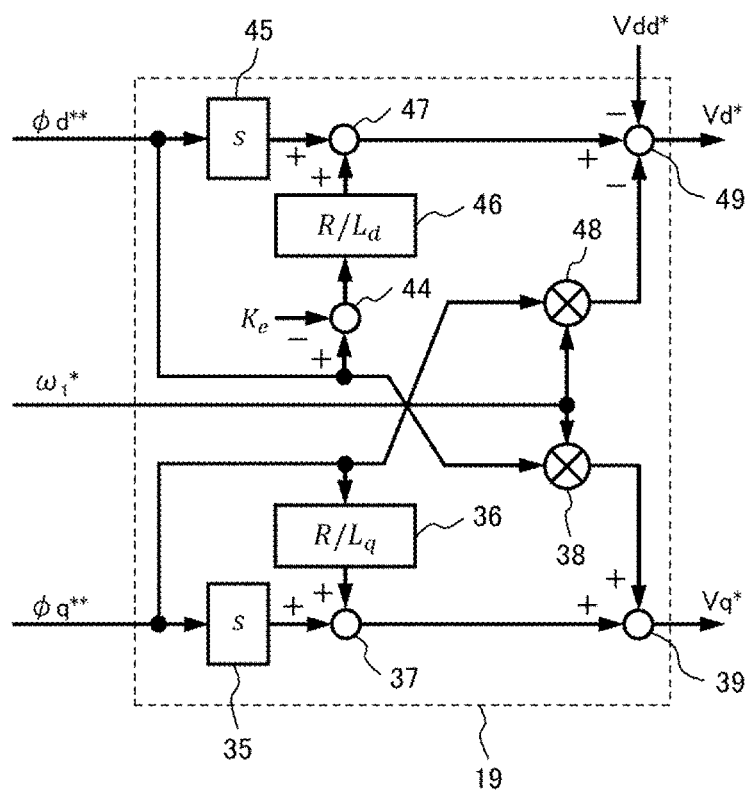
FIG. 4 is a functional block diagram illustrating a configuration of a voltage vector calculation unit 19 based on Equation (1).

FIG. 4 is a functional block diagram illustrating a configuration of the voltage vector calculation unit 19 based on the inverse model represented by Equation (1). Note that R, Ld, Lq, and Ke are a winding resistance, a d-axis inductance, a q-axis inductance, and a magnet magnetic flux in the PMSM 1, respectively.

As illustrated in FIG. 4, a differentiator 45 calculates the differentiation of φd. An adder-subtractor 44 calculates a difference (φd−Ke) between φd and Ke. This difference calculation value is multiplied by R/Ld by a proportioner 46. The differential calculation value obtained by the differentiator 45 and the difference calculation value multiplied by the gain R/Ld by the proportioner 46 are added by an adder 47**. $\omega_1^*$ and φq are multiplied in a multiplier 48. An adder-subtractor 49 subtracts the multiplication value obtained by the multiplier 48** and the d-axis stabilization voltage command value Vdd* created by the damping ratio control unit 27 (FIG. 1) from the addition calculation value obtained by the adder 47. As a result, Vd* is created.

As illustrated in FIG. 4, a differentiator 35 calculates the differentiation of φq. A proportioner 36 multiplies φq by R/Lq. The differential calculation value obtained by the differentiator 35 and φq multiplied by R/Lq in the proportioner 36 are added by the adder 37**. $\omega_1^*$ and φd are multiplied in the multiplier 38. An adder 39 adds the addition calculation value obtained by the adder 37 and the multiplication value obtained by the multiplier 38**. As a result, Vq* is created.

As described above, the voltage command value (d-axis voltage value output from the adder 47) calculated by using the voltage equation (Equation (1)) with the motor magnetic flux as a state quantity is corrected by the voltage command value (d-axis stabilization voltage command value Vdd*) corresponding to the vibration component of the motor magnetic flux (d-axis magnetic flux). As a result, the PMSM 1 can be stably controlled.

The coordinate conversion unit 11 illustrated in FIG. 1 performs coordinate conversion on the dq-axis voltage command values Vd* and Vq* for the power converter 2 output from the voltage vector calculation unit 19 by using the magnetic pole position information θ* detected by the magnetic pole position detector 4, and thus creates and outputs three-phase voltage command values Vu*, Vv*, and Vw* for the power converter 2.

The DC voltage detector 6 detects a voltage of the DC voltage source 9 and outputs DC voltage information Vdc.

A PWM controller 12 illustrated in FIG. 1 receives the three-phase voltage command values Vu*, Vv*, and Vw* from the coordinate conversion unit 11, receives the DC voltage information Vdc from the DC voltage detector 6, and creates and outputs a gate signal to be provided to the power converter 2 through pulse width modulation on the basis of the three-phase voltage command values Vu*, Vv*, and Vw* and the DC voltage information Vdc. The PWM controller 12 creates a gate signal through pulse width modulation using a triangular wave as a carrier signal and using a three-phase voltage command value as a modulation wave, for example.

Hereinafter, operations and effects of the synchronous machine control device according to Example 1 will be described.

Figure 5:
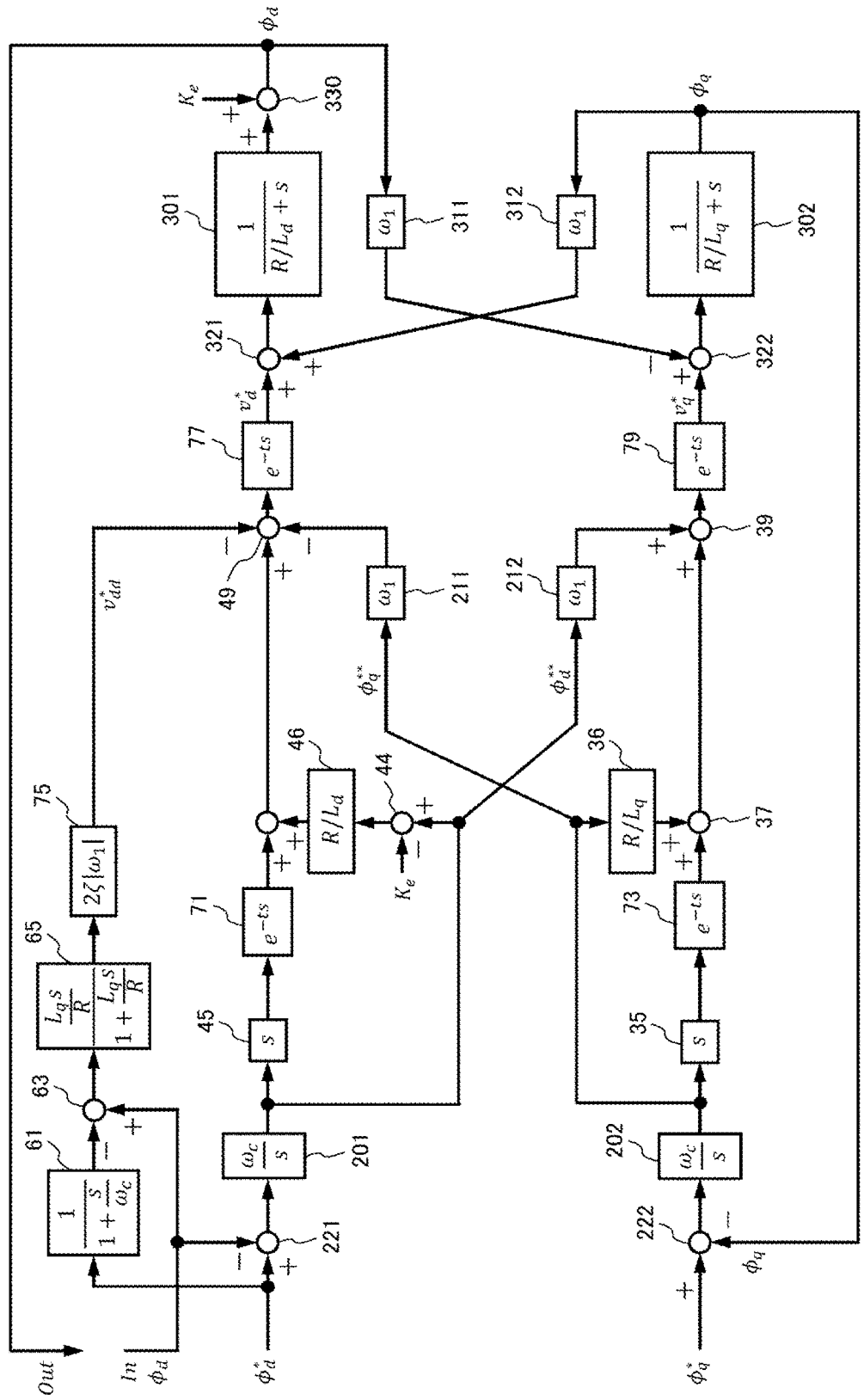
FIG. 5 is a block diagram illustrating a modeled configuration of a control system of Example 1.

FIG. 5 is a block diagram illustrating a modeled configuration of a control system of Example 1 including the PMSM 1. FIG. 5 illustrates an input of the second dq-axis magnetic flux command calculation unit 25 (FIG. 1) to an output of the PMSM 1 (FIG. 1).

It is assumed that the dq-axis magnetic flux estimation unit 23 can estimate a magnetic flux without errors, and the second dq-axis magnetic flux command calculation unit 25 sets $K_P=0$ and $K_I=\omega c$ (integrators 201 and 202). In the damping ratio control unit 27, the proportioner 67 (2ζ), the absolute value calculator 68 (ABS), and the multiplier 69 illustrated in FIG. 3 are represented by one calculation unit as a gain setting unit 75 (2ζ|$\omega_1$|) in FIG. 5. The model in FIG. 5 includes control lag units 71 and 73 ($e^{-\tau s}$) representing control lags of the differentiators 35 and 45, and control lag units 77 and 79 ($e^{-ts}$) representing control lags between the voltage vector calculation unit 19 and the PMSM 1.

Figure 6:
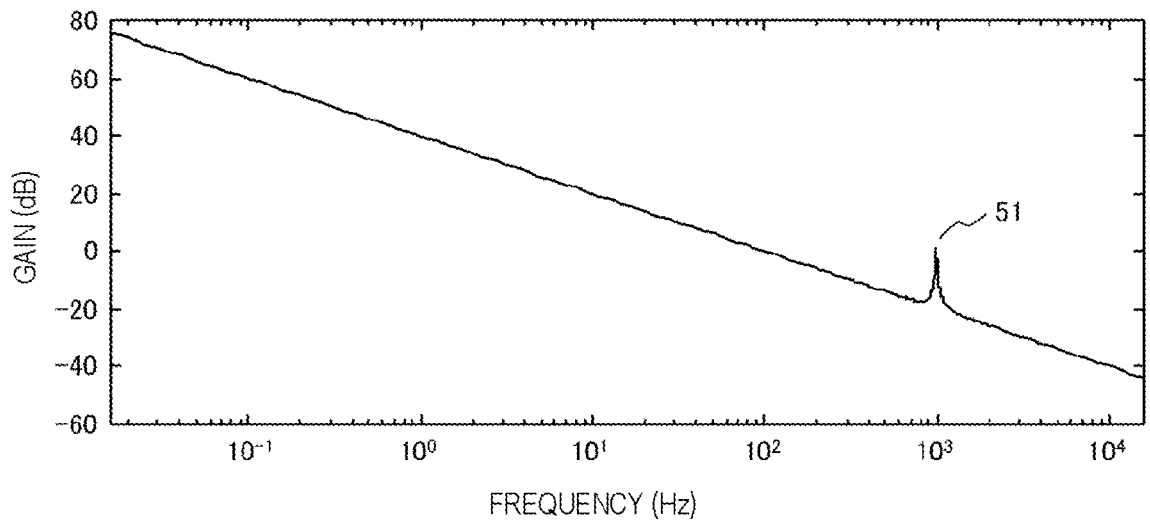
FIG. 6 is a Bode diagram illustrating an example of gain characteristics of the control system of Example 1.

FIG. 6 is a Bode diagram illustrating an example of gain characteristics of the control system of Example 1 modeled as illustrated in FIG. 5. That is, FIG. 6 illustrates a result in which the present inventor has examined gain characteristics by using a round transfer function in FIG. 5 (the same applies to FIG. 7 that will be described later).

In FIG. 6, a value of the damping ratio ζ in the gain setting unit 75 of the damping ratio control unit is set to 0. In this case, the damping ratio control unit 27 does not substantially operate. Thus, as illustrated in FIG. 6, resonance (51) occurs at the motor fundamental frequency.

Figure 7:
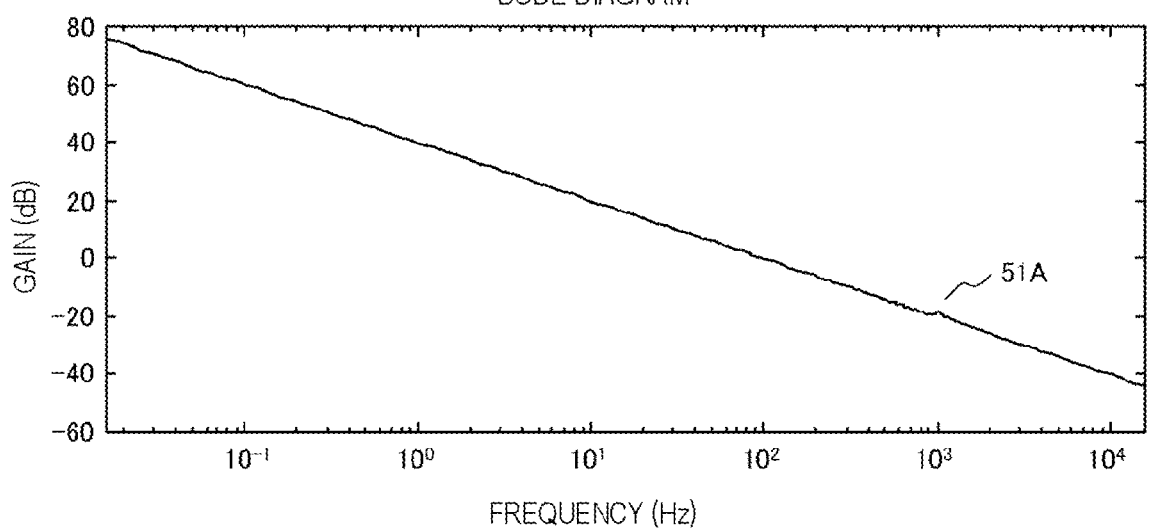
FIG. 7 is a Bode diagram illustrating an example of gain characteristics of the control system of Example 1.

FIG. 7 is a Bode diagram illustrating an example of gain characteristics of the control system of Example 1 modeled as illustrated in FIG. 5.

In FIG. 7, a value of the damping ratio ζ in the gain setting unit 75 of the damping ratio control unit is set to 0.04. In this case, since the damping ratio control unit 27 operates, resonance (51A) at the motor fundamental frequency is suppressed. That is, the vibration of the motor magnetic flux at the motor fundamental frequency is prevented, and the stability of control is improved.

Figure 8:
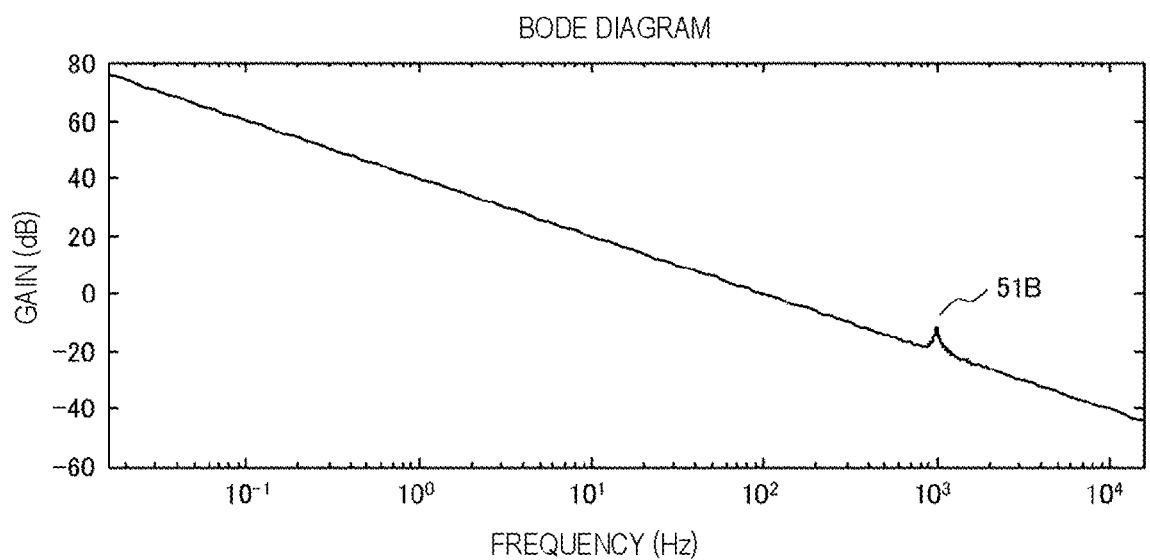
FIG. 8 is a Bode diagram illustrating an example of gain characteristics of a control system of a comparative example.

FIG. 8 is a Bode diagram illustrating an example of gain characteristics of a control system of a comparative example. FIG. 8 illustrates an example of a study result by the present inventor.

In the present comparative example, a voltage equation having a current as a state quantity is used to create a voltage command value, and the related art (for example, the technique disclosed in PTL 1 or PTL 2 described above) is applied.

In the comparative example, although a magnitude of resonance is suppressed compared with the case of FIG. 7, since the inductance of the motor changes due to magnetic saturation, resonance (51B) occurs at the motor fundamental frequency as illustrated in FIG. 8.

Figure 9:
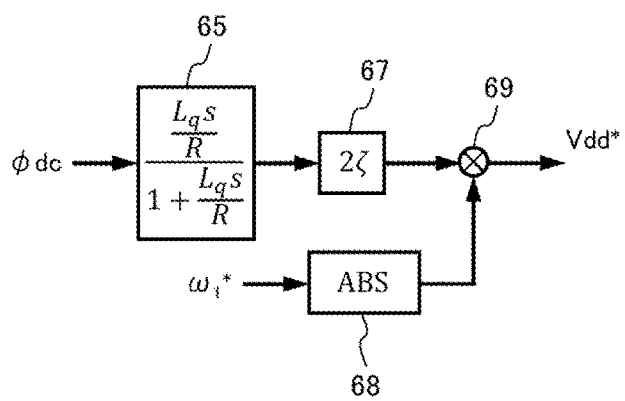
FIG. 9 is a block diagram illustrating a configuration of a damping ratio control unit in a synchronous machine control device according to a modification example.

FIG. 9 is a block diagram illustrating a configuration of a damping ratio control unit in a synchronous machine control device according to a modification example of Example 1.

As illustrated in FIG. 9, in the present modification example, the d-axis magnetic flux estimation value φdc is input to the high-pass filter 65 in the damping ratio control unit, and a vibration component of the d-axis magnetic flux estimation value φdc is extracted by the high-pass filter 65. According to the present modification example, the configuration of the damping ratio control unit can be simplified.

In Example 1 described above, since the vibration component of the difference between the d-axis magnetic flux estimation value φdc and the first-order lag of the first d-axis magnetic flux command value φd* is extracted, the vibration component of the motor magnetic flux (d-axis magnetic flux) can be accurately extracted even if the first d-axis magnetic flux command value φd* greatly varies.

Means for extracting the vibration component of the motor magnetic flux is not limited to the high-pass filter 65 in Example 1, and various means capable of extracting the vibration component of the fundamental frequency may be applied. For example, Fourier series expansion, Fourier transform, and a bandpass filter may be applied.

As described above, according to Example 1, the voltage command value of the power converter is corrected according to the vibration component of the magnetic flux such that the magnetic flux of the synchronous machine matches the first magnetic flux command value, and thus the resonance of the synchronous machine can be suppressed. Therefore, the stability of control of the synchronous machine is improved.

The second magnetic flux command value is created such that the magnetic flux of the synchronous machine matches the first magnetic flux command value, and the voltage command value is created by using the second magnetic flux command value. Thus, the synchronous machine can be stably controlled up to a high-speed range.

In Example 1, since the voltage command value is created by using the magnetic flux as a state quantity, the synchronous machine can be stably controlled even if the inductance of the synchronous machine changes due to magnetic saturation.

Example 2

Figure 10:
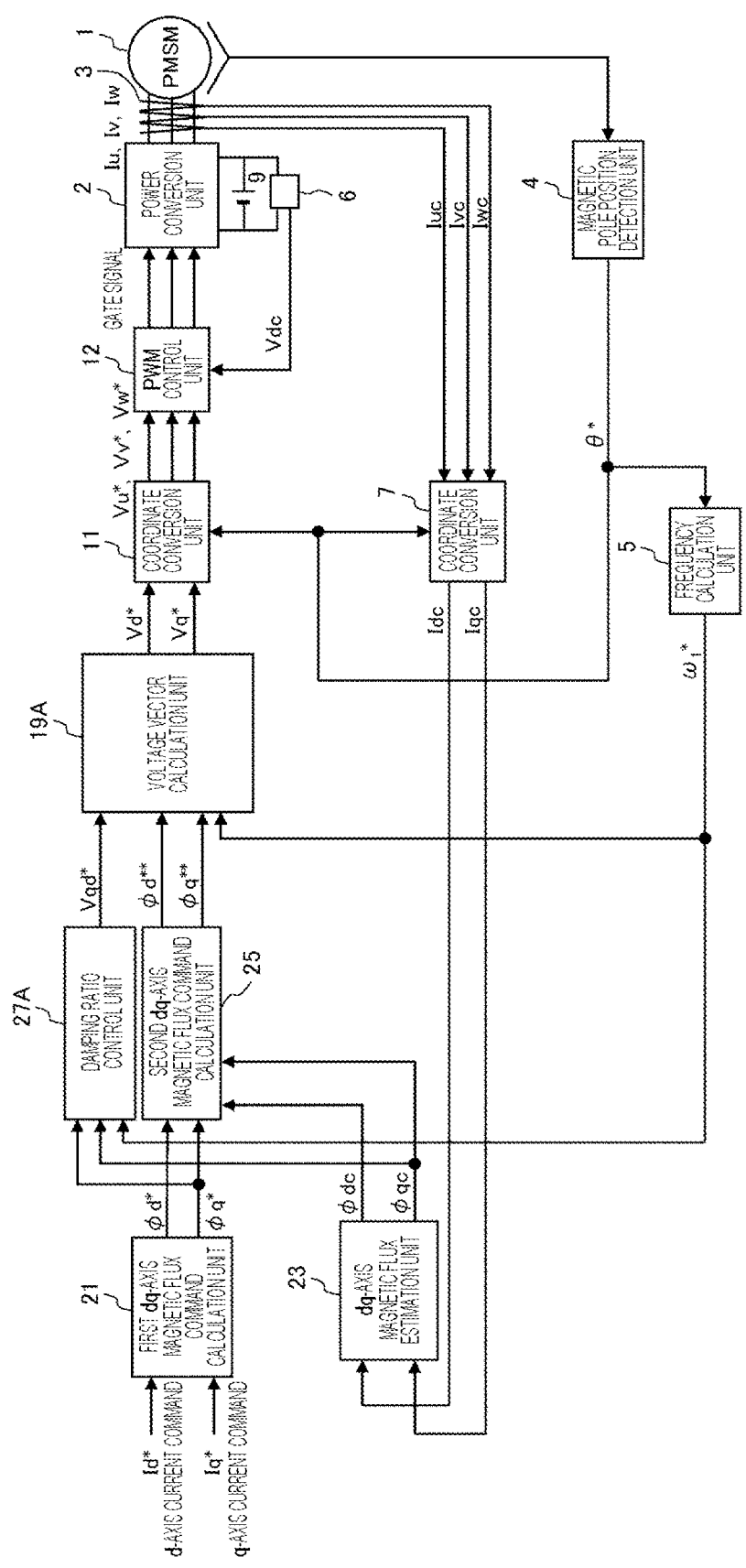
FIG. 10 is a functional block diagram illustrating a configuration of a synchronous machine control device according to Example 2.

FIG. 10 is a functional block diagram illustrating a configuration of a synchronous machine control device according to Example 2 of the present invention.

Hereinafter, a description will be made focusing on differences from Example 1.

As illustrated in FIG. 10, the damping ratio control unit 27A according to Example 2 extracts a vibration component of a q-axis magnetic flux on the basis of the first q-axis magnetic flux command value φq* and the q-axis magnetic flux estimation value φqc, and creates a q-axis stabilization voltage command value Vqd* for damping the vibration component according to the extracted vibration component.

Figure 11:
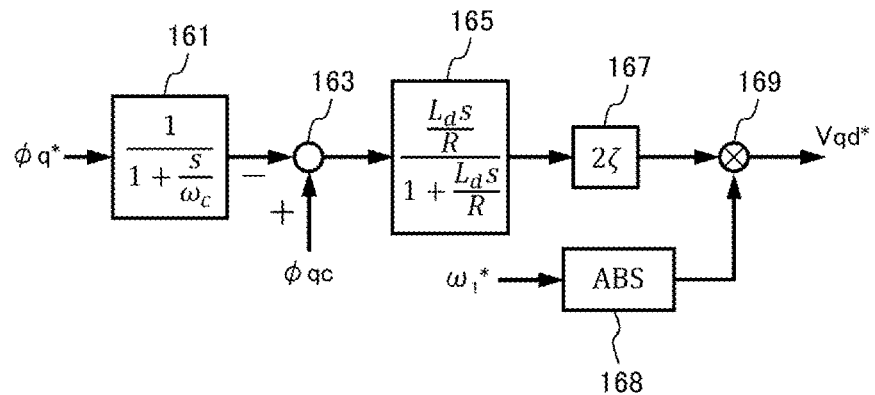
FIG. 11 is a functional block diagram illustrating a configuration of a damping ratio control unit 27A (FIG. 10).

FIG. 11 is a functional block diagram illustrating a configuration of a damping ratio control unit 27A (FIG. 10) in Example 2.

A first-order lag calculator 161, an adder-subtractor 163, a high-pass filter 165, a proportioner 167, an absolute value calculator 168, and a multiplier 169 illustrated in FIG. 11 correspond to the first-order lag calculator 61, the adder-subtractor 63, the high-pass filter 65, the proportioner 67, the absolute value calculator 68, and the multiplier 69 in Example 1 (FIG. 3), respectively.

In Example 2, unlike Example 1, a vibration component of a difference calculation value between the q-axis magnetic flux estimation value φqc and the first-order lag of the first q-axis magnetic flux command value φq* is extracted by the high-pass filter 165. The extracted vibration component is multiplied by a gain (2ζ) in the proportioner 167. An absolute value of speed information $\omega_1$* of the PMSM 1 (FIG. 10) is multiplied by the vibration component of the q-axis magnetic flux multiplied by the gain (2ζ) in the multiplier 169. As a result, the magnetic flux value is converted into a voltage value, and a q-axis stabilizing voltage command value Vqd* is created.

Figure 12:
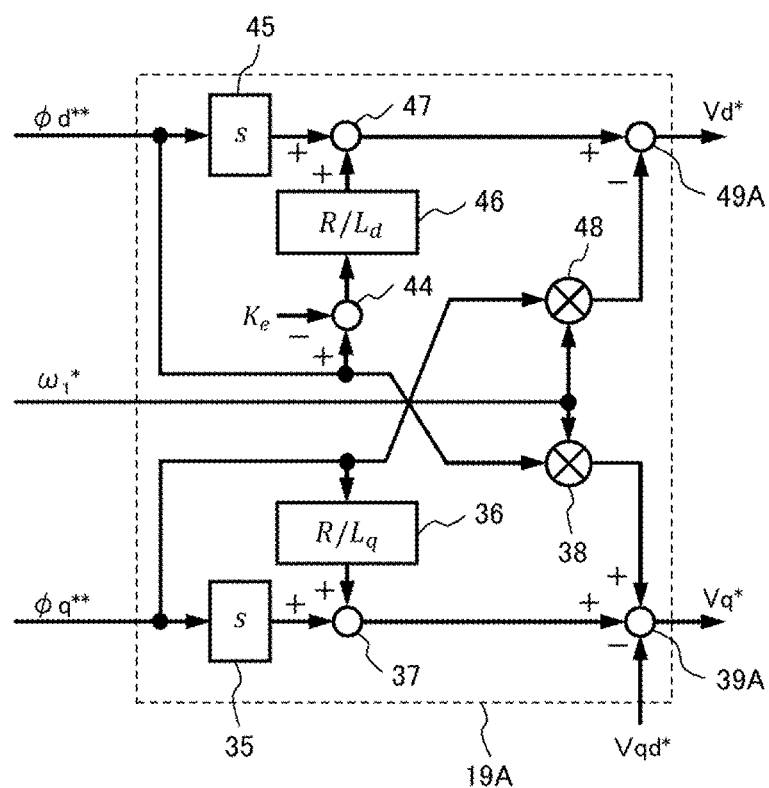
FIG. 12 is a functional block diagram illustrating a configuration of a voltage vector calculation unit 19A (FIG. 10).

FIG. 12 is a functional block diagram illustrating a configuration of a voltage vector calculation unit 19A (FIG. 10) in Example 2.

In the voltage vector calculation unit 19A, an inverse model of the motor model represented by the voltage equation of the above Equation (1) is used, similarly to Example 1.

In Example 2, as illustrated in FIG. 12, the adder-subtractor 39A adds the multiplication value obtained by the multiplier 38 to the addition calculation value obtained by the adder 37, and subtracts the q-axis stabilization voltage Vqd* created by the damping ratio control unit 27A (FIG. 10). As a result, the q-axis voltage command value Vq* is created.

The adder-subtractor 49A subtracts the multiplication value obtained by the multiplier 48 from the addition calculation value obtained by the adder 47. As a result, the q-axis voltage command value Vq* is created.

Figure 13:
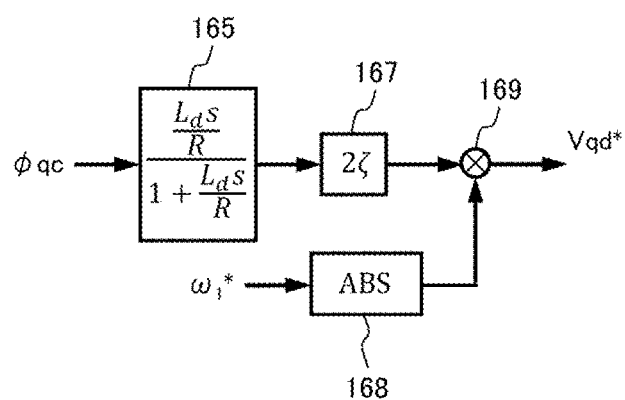
FIG. 13 is a block diagram illustrating a configuration of a damping ratio control unit in a synchronous machine control device according to a modification example of Example 2.

FIG. 13 is a block diagram illustrating a configuration of a damping ratio control unit in a synchronous machine control device according to a modification example of Example 2.

As illustrated in FIG. 13, in the present modification example, the q-axis magnetic flux estimation value φqc is input to the high-pass filter 165 in the damping ratio control unit, and the high-pass filter 165 extracts a vibration component of the q-axis magnetic flux estimation value φqc. According to the present modification example, the configuration of the damping ratio control unit can be simplified.

In Example 2 described above, since a vibration component of a difference between the q-axis magnetic flux estimation value φqc and the first-order lag of the first q-axis magnetic flux command value φq* is extracted, the vibration component of the motor magnetic flux (q-axis magnetic flux) can be accurately extracted even if the first q-axis magnetic flux command value φq* greatly varies.

According to Example 2, similarly to Example 1, the resonance of the synchronous machine can be suppressed by correcting the voltage command value of the power converter according to the vibration component of the magnetic flux such that the magnetic flux of the synchronous machine matches the first magnetic flux command value. Therefore, the stability of control of the synchronous machine is improved.

Similarly to Example 1, the second magnetic flux command value is created such that the magnetic flux of the synchronous machine matches the first magnetic flux command value, and the voltage command value is created by using the second magnetic flux command value. Thus, the synchronous machine can be stably controlled up to a high-speed range.

in Example 2, as in Example 1, since the voltage command value is created by using the magnetic flux as a state quantity, the synchronous machine can be stably controlled even if the inductance of the synchronous machine changes due to magnetic saturation.

Example 3

Figure 14:
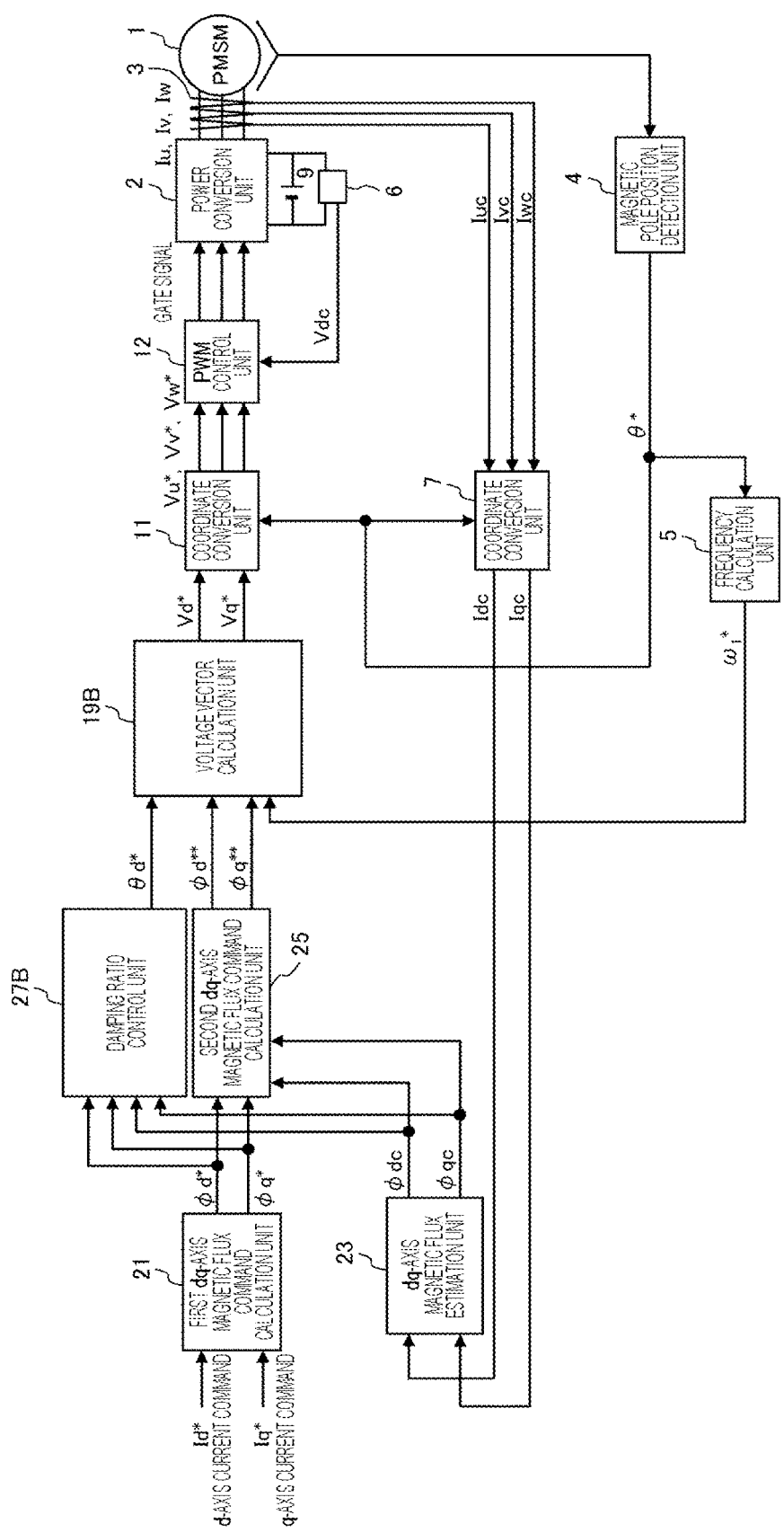
FIG. 14 is a functional block diagram illustrating a configuration of a synchronous machine control device according to Example 3.

FIG. 14 is a functional block diagram illustrating a configuration of a synchronous machine control device according to Example 3 of the present invention.

Hereinafter, a description will be made focusing on differences from Examples 1 and 2.

As illustrated in FIG. 14, the damping ratio control unit 27B in Example 3 extracts a vibration component of the dq-axis magnetic flux on the basis of the first d-axis magnetic flux command value φd* and the first q-axis magnetic flux command value φq*, and the d-axis magnetic flux estimation value φdc and the q-axis magnetic flux estimation value φqc, and creates a stabilization voltage command phase correction amount θd* for attenuating the vibration component according to the extracted vibration component.

In Examples 1 and 2, whereas the voltage value of the voltage command calculated from the voltage equation (Equation (1)) is corrected, in Example 3, a phase of the voltage command is corrected by using the stabilization voltage command phase correction amount θd*.

Figure 15:
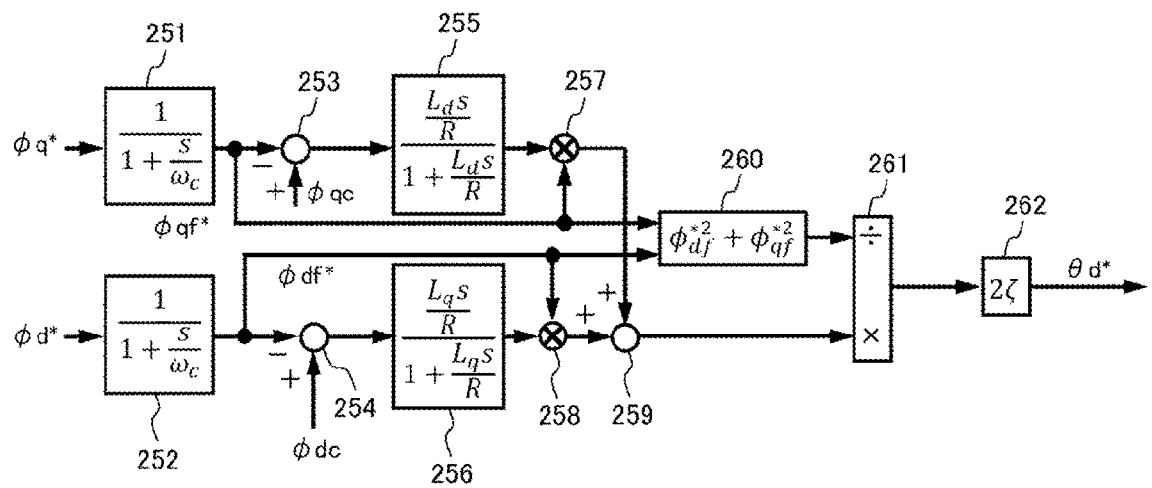
FIG. 15 is a functional block diagram illustrating a configuration of a damping ratio control unit 27B (FIG. 14).

FIG. 15 is a functional block diagram illustrating a configuration of a damping ratio control unit 27B (FIG. 14) in Example 3.

As illustrated in FIG. 15, in the damping ratio control unit 27B, the first-order lag calculator 251 calculates the first-order lag φqf* of the first q-axis magnetic flux command φq*. The first-order lag calculator 252 calculates a first-order lag φdf* of the first d-axis magnetic flux command φd*. In Example 3, a reciprocal of the cutoff angular frequency we of the control system is a time constant at the first-order lag.

A difference (φqc−φqf*) between the q-axis magnetic flux estimation value φqc and the first-order lag φqf* of the first q-axis magnetic flux command φq* is calculated by the adder-subtractor 253. A vibration component of the difference calculation value is extracted by the high-pass filter 255 (a transfer function is illustrated in FIG. 15).

The difference (φdc−φdf*) between the d-axis magnetic flux estimation value φdc and the first-order lag φdf* of the first d-axis magnetic flux command φd* is calculated by the adder-subtractor 254. The vibration component of the difference calculation value is extracted by the high-pass filter 256 (a transfer function is illustrated in FIG. 15).

That is, the high-pass filters 255 and 256 extract the vibration components of the q-axis magnetic flux and the d-axis magnetic flux, respectively.

The vibration component of the q-axis magnetic flux extracted by the high-pass filter 255 is multiplied by φqf* in the multiplier 257. The vibration component of the d-axis magnetic flux extracted by the high-pass filter 256 is multiplied by φdf* in the multiplier 258. The multiplication value obtained by the multiplier 257 and the multiplication value obtained by the multiplier 258 are added by the adder 259. The addition calculation value by the adder 259 corresponds to an inner product of the magnetic flux command vector and the vibration component vector of the magnetic flux.

Note that φqf* and φdf* are also input to a square sum calculator 260 in addition to the multipliers 257 and 258. The square sum calculator 260 calculates a sum of the square of φqf* and the square of φdf*.

The square sum calculation value $(\varphi qf^*)^2+(\varphi df^*CC)^2)$ obtained by the square sum calculator 260 and the addition value by the adder 259 are input to a divider 261. The divider 261 divides the square sum calculation value obtained by the square sum calculator 260 by the addition value obtained by the adder 259 ((addition value)/(square sum)).

Here, the division value obtained by the divider 261 is a value obtained by converting ((component in amplitude direction of magnetic flux command)/(magnitude of magnetic flux command $(=(\varphi qf^*)^2+(\varphi df^*)^2))^{1/2})$) the value ((inner product of magnetic flux command vector and vibration component vector of magnetic flux)/(magnitude of magnetic flux command vector $(=((\varphi qf^*)^2+(\varphi df^*)^2))^{1/2})$) of the component in the amplitude direction of the magnetic flux command of the vibration component of the magnetic flux into a phase correction amount (provisional correction amount before gain multiplication) of the voltage command.

The division value obtained by the divider 261 is multiplied by a gain (2ζ) in the proportioner 262. As a result, the stabilization voltage command phase correction amount θd* is created.

Figure 16:
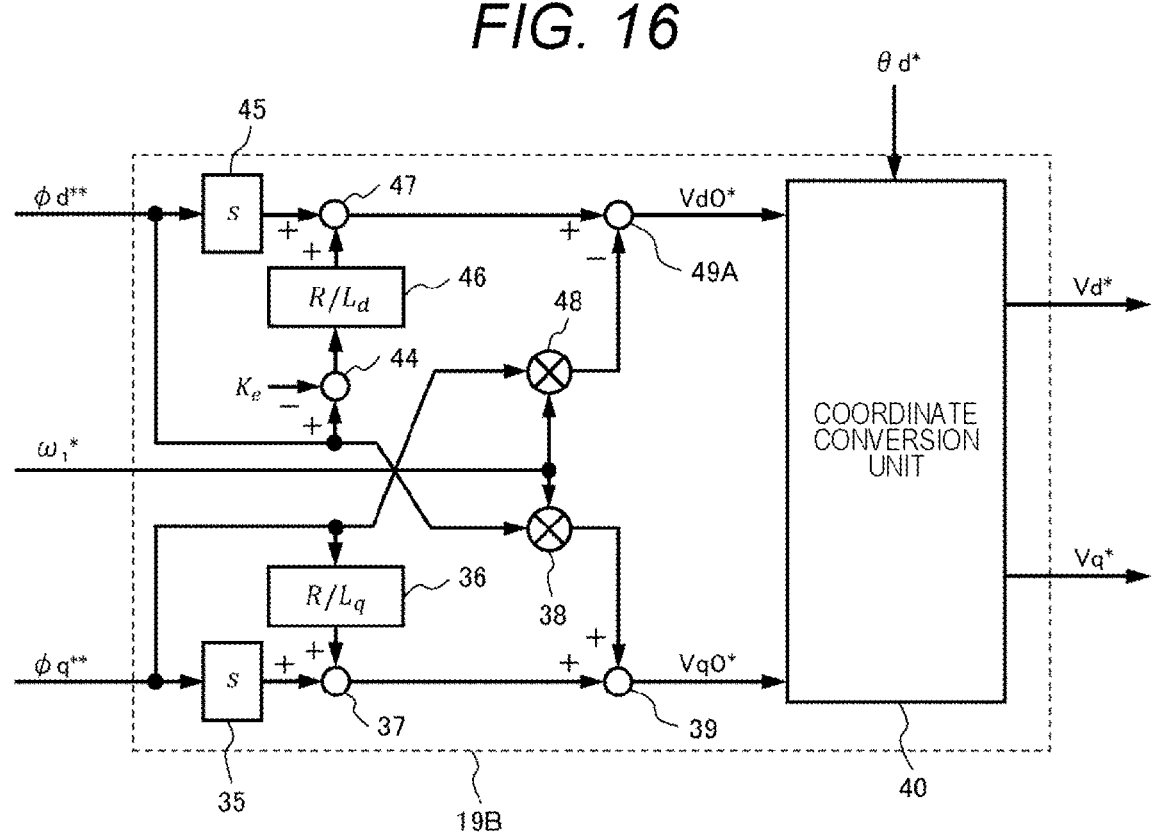
FIG. 16 is a functional block diagram illustrating a configuration of a voltage vector calculation unit 19B (FIG. 14).

FIG. 16 is a functional block diagram illustrating a configuration of the voltage vector calculation unit 19B (FIG. 14) in Example 3.

In the voltage vector calculation unit 19B, similarly to Example 1, an inverse model of the motor model represented by the voltage equation of Equation (1) described above is used.

The voltage vector calculation unit 19B in Example 3 includes a coordinate conversion unit 40 that corrects a phase of the voltage command value according to the stabilization voltage command phase correction amount θd* created by the damping ratio control unit 27B.

The coordinate conversion unit 40 rotates a phase of the voltage command value (voltage command vector (Vd0*, Vq0*)) created by using the voltage equation according to the stabilization voltage command phase correction amount θd*. As described above, θd* is created according to the vibration component of the magnetic flux vector in the amplitude direction. Therefore, since the vibration of the motor magnetic flux, that is, the motor current is suppressed, the stability of control of the PMSM 1 is improved.

In the related art (for example, the technique disclosed in PTL 1 or PTL 2 described above), a voltage equation with a current as a state quantity is used to create a voltage command value, but in this case, directions of the current and the voltage change according to torque and speed, and the relationship is not constant. In contrast, in each embodiment including Example 3, a voltage equation having a magnetic flux as a state quantity is used, but in this case, if the first-order resistance component is ignored, the voltage and the magnetic flux are orthogonal to each other.

Figure 17:
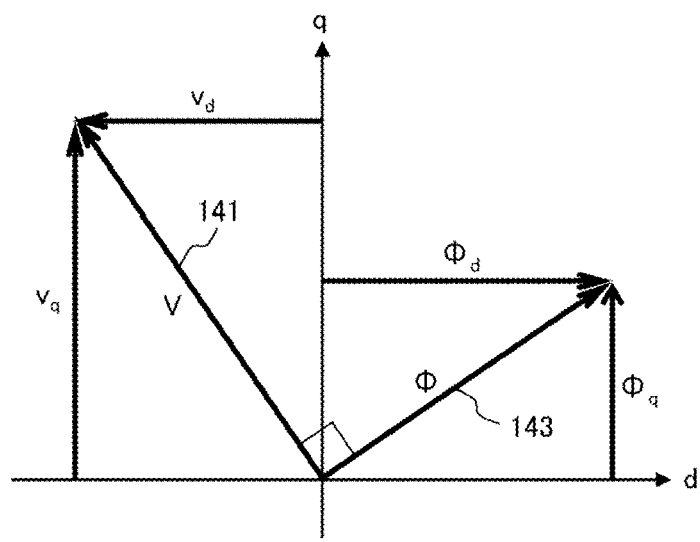
FIG. 17 is a vector diagram illustrating a voltage vector and a magnetic flux vector.

FIG. 17 is a vector diagram illustrating a voltage vector and a magnetic flux vector.

As illustrated in FIG. 17, the magnetic flux vector p and the voltage vector V are orthogonal to each other. Therefore, the amplitude direction of the magnetic flux corresponds to a direction orthogonal to the amplitude direction of the voltage, that is, the phase direction of the voltage vector.

Therefore, when the voltage phase angle is controlled according to the vibration component in the amplitude direction of the magnetic flux such that the component of the voltage in the phase direction is opposite to the vibration component as in Example 3, the resonance of the PMSM 1 can be suppressed as in the case of correcting the voltage command value in the direction opposite to the vibration component of the magnetic flux (refer to FIGS. 4 and 12 (subtraction of Vdd* and Vqd in the adder-subtractors 49 and 39A)) as in Examples 1 and 2.

Note that, in Example 3, since the voltage phase is corrected and controlled, resonance can be reliably suppressed even when the output voltage of the power converter 2 (for example, an inverter) is in a region close to the limit (upper limit) of an outputtable voltage. For example, in FIG. 17, even if it is difficult to correct the magnitude of the voltage vector V, it is possible to suppress variations in the magnetic flux vector by correcting the phases and changing Vd and Vq.

As described above, according to Example 3, the resonance of the synchronous machine can be suppressed in the region close to the voltage limit. For example, Example 3 is suitable in a case where the synchronous machine is driven and controlled by using one-pulse control as illustrated in FIG. 18.

Figure 18:
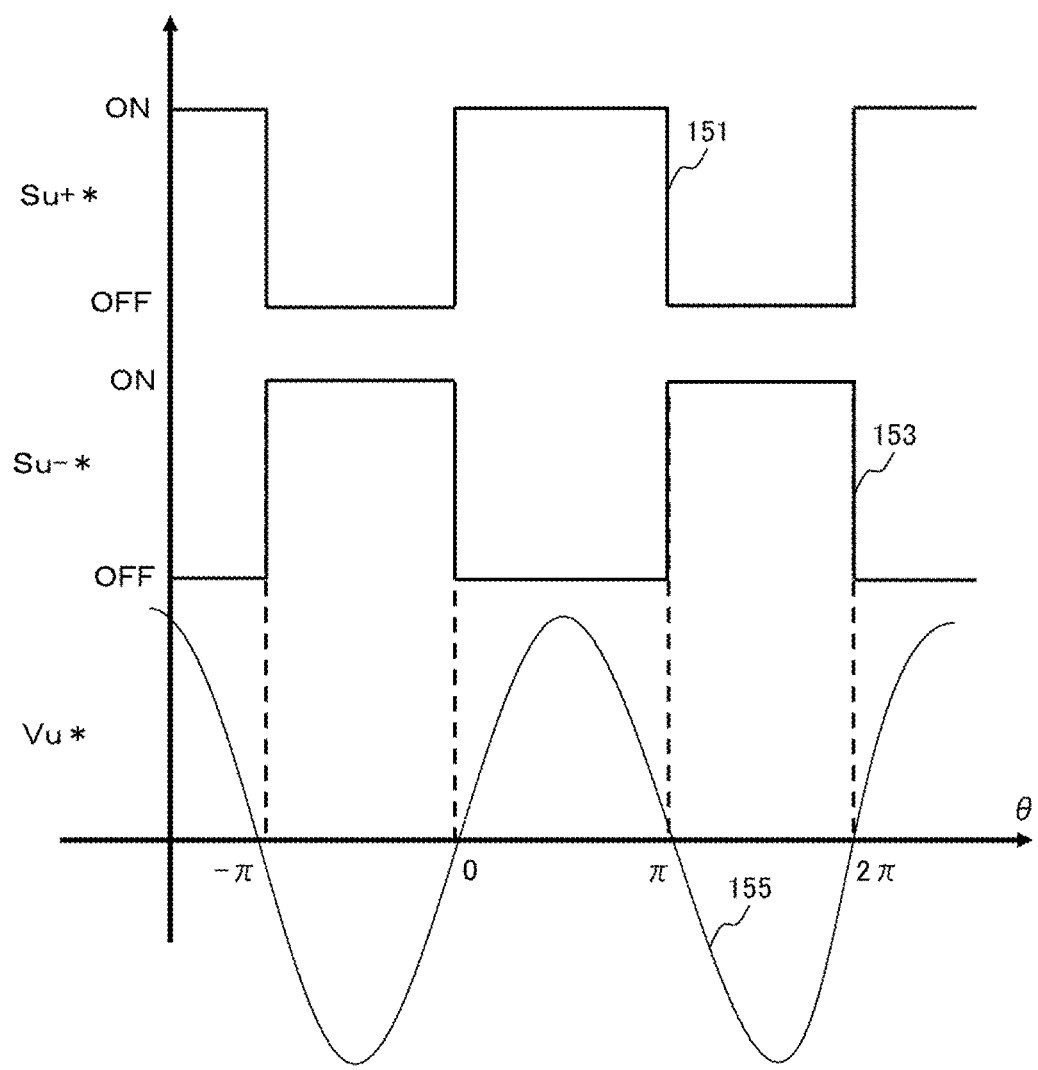
FIG. 18 is a waveform diagram illustrating a gate signal and a voltage command value in 1-pulse control.

FIG. 18 is a waveform diagram illustrating U-phase gate signals (Su+*, Su-*) and a U-phase voltage command value Vu* in the one-pulse control. Note that the U-phase gate signals Su+* and Su-* are gate signals respectively provided to a U-phase upper arm and a U-phase lower arm of the power converter 2 (three-phase inverter).

As illustrated in FIG. 18, the PWM controller 12 outputs a rectangular wave gate signal that is repeatedly turned on and off at the fundamental frequency in the one-pulse control. Therefore, the magnitude of the voltage output from the power converter 2 is maintained at a constant value. Therefore, although it is difficult to correct the magnitude of the voltage value, resonance can be suppressed by correcting the phase of the voltage.

As described above, according to Example 3, even in a case where it is difficult to correct the magnitude of the voltage command, the vibration of the synchronous machine can be suppressed by correcting the phase of the voltage command.

According to Example 3, the same effects as those of Examples 1 and 2 are achieved.

Example 4

Figure 19:
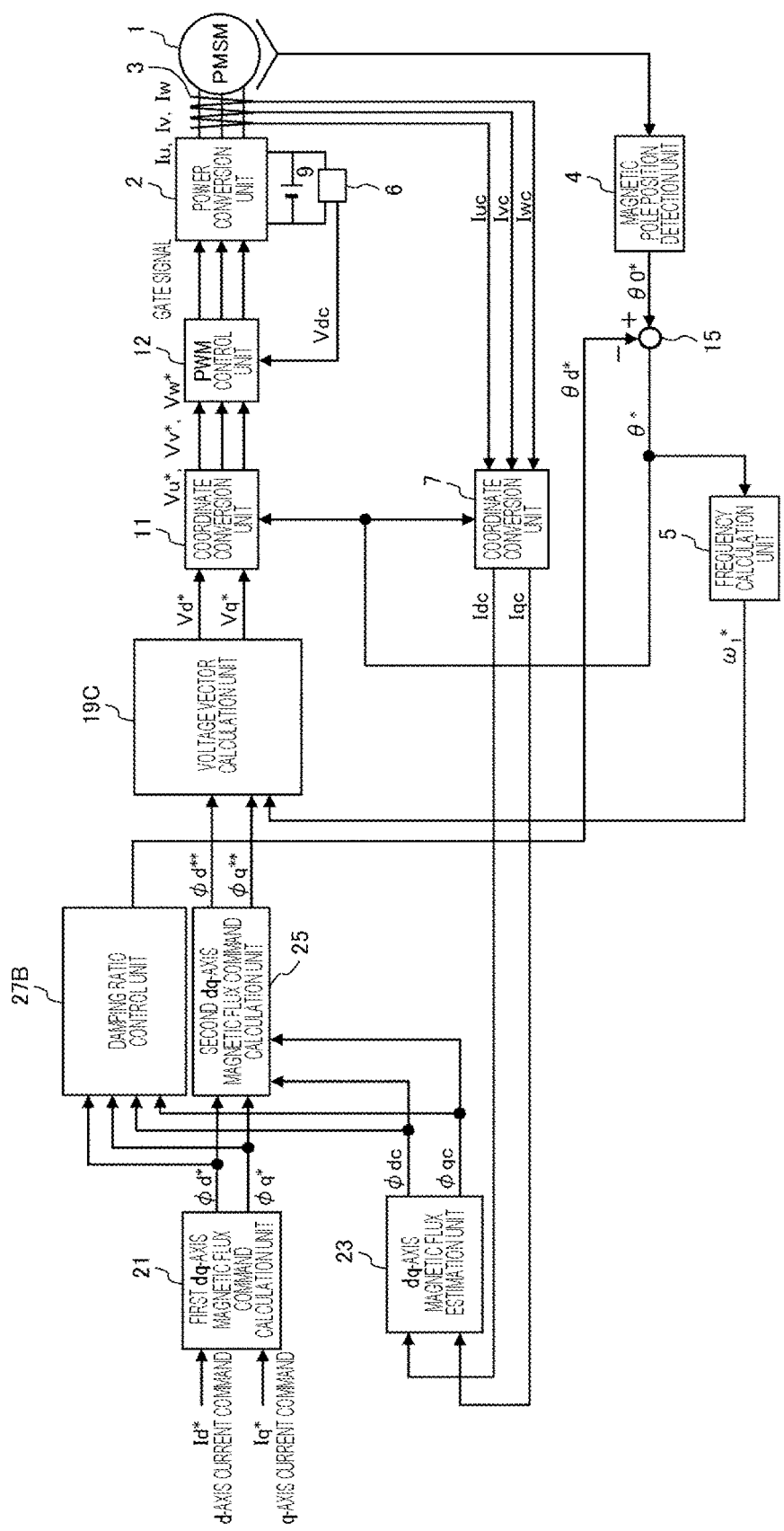
FIG. 19 is a functional block diagram illustrating a configuration of a synchronous machine control device according to Example 4.

FIG. 19 is a functional block diagram illustrating a configuration of a synchronous machine control device according to Example 4 of the present invention.

Hereinafter, a description will be made focusing on differences from Example 3.

As illustrated in FIG. 19, in Example 4, the adder-subtractor 15 subtracts the stabilization voltage command phase correction amount θd* created by the damping ratio control unit 27B from the magnetic pole position detection value θ0* obtained by the magnetic pole position detector 4. The subtraction value (θ0*-θd*) obtained by the adder-subtractor 15 is used as the magnetic pole position information θ* in the frequency calculation unit 5, the coordinate conversion unit 7, and the coordinate conversion unit 11.

That is, the control rotation coordinate axis used for the three-phase/dq conversion in the coordinate conversion unit 7 and the control rotation coordinate axis used for the dq/three-phase conversion in the coordinate conversion unit 11 are rotated according to θd*.

Figure 20:
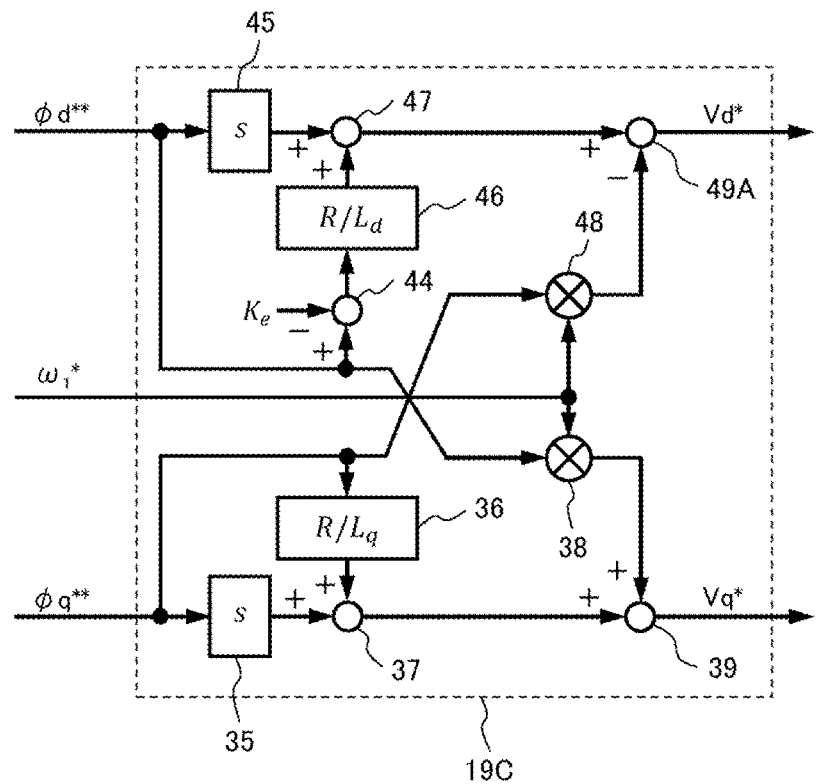
FIG. 20 is a functional block diagram illustrating a configuration of a voltage vector calculation unit 19C (FIG. 19).

FIG. 20 is a functional block diagram illustrating a configuration of a voltage vector calculation unit 19C (FIG. 19) in Example 4.

The voltage vector calculation unit 19C in Example 4 does not include the coordinate conversion unit 40 unlike in Example 3 (FIG. 16). Thus, the voltage vector calculation unit 19C outputs the d-axis voltage value and the q-axis voltage value, which are calculated on the basis of the inverse model represented by Equation (1), as the d-axis voltage command value Vd* and the q-axis voltage command value Vq*, respectively, without correction.

In Example 4, the stabilization voltage command phase correction amount θd* is created similarly to Example 3, but in the voltage vector calculation unit 19C, correction of the voltage phase using the stabilization voltage command phase correction amount θd* is not executed. In Example 4, the stabilization voltage command phase correction amount θd* is subtracted from the magnetic pole position detection value θ0* to obtain the position information θ*, and vector control is executed by using the position information θ*. As a result, the phase of the voltage vector can be substantially controlled.

Instead of the magnetic pole position detection value θ0' detected by the magnetic pole position detector 4 (for example, a resolver) in Example 4 (FIG. 19), a magnetic pole position estimation value in sensorless control may be used. When a phase locked loop (PLL) is used to estimate a magnetic pole position, a target value of the PLL may be used. According to Example 4, since the resonance of the synchronous machine can be reliably suppressed even in the sensorless control, the stability of the sensorless control is improved.

Example 5

Figure 21:
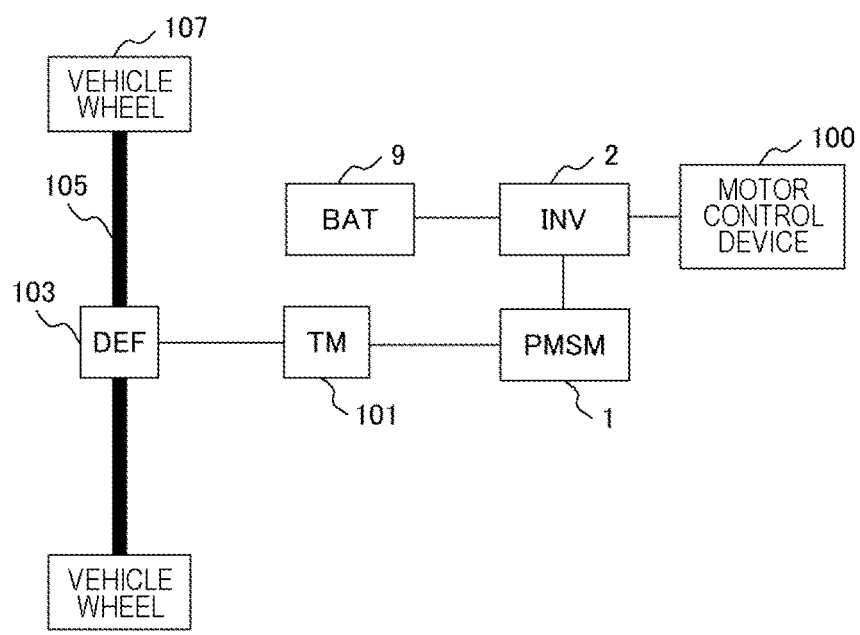
FIG. 21 is a block diagram illustrating a configuration of an electric vehicle according to Example 5.

FIG. 21 is a block diagram illustrating a configuration of an electric vehicle according to Example 5 of the present invention. The electric vehicle in Example 5 is an electric automobile.

The motor control device 100 controls AC power supplied from the power converter 2 (inverter) to the PMSM 1. The DC voltage source 9 (for example, a battery) supplies DC power to the power converter 2 (inverter). The power converter 2 (inverter) is controlled by the motor control device 100 to convert DC power from the DC voltage source 9 into AC power. As the motor control device 100, any one of the synchronous machine control devices of the above-described Examples 1 to 4 is applied.

The PMSM 1 is mechanically connected to a transmission 101. The transmission 101 is mechanically connected to a drive shaft 105 via a differential gear 103 and supplies mechanical power to vehicle wheels 107. As a result, the vehicle wheels 107 are rotationally driven.

Note that the PMSM 1 may be directly connected to the differential gear 103 without the transmission 101. Each of the front and rear wheels of the automobile may be driven by an independent PMSM and inverter.

In an electric automobile, when a high-speed response of torque is required for vibration suppression or idling control, it is required to set a damping ratio of a control system with high accuracy. Thus, although control design is complicated, according to the synchronous machine control devices of Examples 1 to 4, since a damping ratio is substantially controlled, it is possible to perform stable control in which the vibration of the motor is suppressed while increasing the torque response without complicating the control design.

According to the synchronous machine control device of Examples 1 to 4, it is possible to damp the motor vibration in a wide range of operating points corresponding to a wide range of speed or torque from a low level to a high level in the electric automobile.

In an electric automobile, a motor for an electric automobile having a wide range of speed and torque has a small first-order resistance for high efficiency, and an orthogonal relationship between a voltage vector and a magnetic flux vector as illustrated in FIG. 17 is established in a wide speed range. Therefore, Example 3 or Example 4 described above is preferable.

Examples 1 to 4 of the present invention is applicable not only to the above-described electric automobile but also to an electric vehicle including an electric railway vehicle and the like, and achieve the above-described operations and effects.

According to Example 5, since the vibration of the motor can be suppressed, the ride comfort of a driver or a passenger is improved.

Note that the present invention is not limited to the above-described examples, and includes various modification examples. For example, each of the above-described examples has been described in detail in order to describe the present invention in an easy-to-understand manner, and the present invention is not necessarily limited to having all the described configurations. A part of the configuration of each example can be deleted, replaced, or another configuration can be added.

For example, a synchronous machine that is a control target is not limited to a PMSM, and may be a synchronous reluctance motor, a permanent magnet synchronous generator, a wound field synchronous motor, a wound field synchronous generator, or the like.

The PMSM may be in either an embedded magnet type or a surface magnet type, or may be in either an outer rotation type or an inner rotation type.

A semiconductor switching element configuring the inverter main circuit is not limited to an IGBT, and may be a metal oxide semiconductor field effect transistor (MOS-FET) or the like.

The synchronous machine control device according to each of the above examples can be applied as this control device in various synchronous machine drive systems including a synchronous machine, a power converter that drives the synchronous machine, and a control device that controls the power converter.

REFERENCE SIGNS LIST

1 PMSM
2 power converter
3 phase current detector
4 magnetic pole position detector
5 frequency calculation unit
6 DC voltage detector
7 coordinate conversion unit
9 DC voltage source
11 coordinate conversion unit
12 PWM controller
15 adder-subtractor
19 voltage vector calculation unit
19A voltage vector calculation unit
19B voltage vector calculation unit
19C voltage vector calculation unit
21 first dq-axis magnetic flux command calculation unit
23 dq-axis magnetic flux estimation unit
25 second dq-axis magnetic flux command calculation unit
27 damping ratio control unit
27A damping ratio control unit
27B damping ratio control unit
35 differentiator
36 proportioner
37 adder
38 multiplier
39 adder
39A adder-subtractor
40 coordinate conversion unit
44 adder-subtractor
45 differentiator
46 proportioner
47 adder
48 multiplier
49 adder-subtractor
49A adder-subtractor
61 first-order lag calculator
63 adder-subtractor
65 high-pass filter
67 proportioner
68 absolute value calculator
69 multiplier
71 control lag unit
73 control lag unit
75 gain setting unit
77 control lag unit
79 control lag unit
81 adder-subtractor
83 integrator
85 proportioner
87 proportioner
89 adder
91 adder-subtractor
93 integrator 95 proportioner
97 proportioner
99 adder
100 motor control device
101 transmission
103 differential gear
105 drive shaft
107 vehicle wheel
161 first-order lag calculator
163 adder-subtractor
165 high-pass filter
167 proportioner
168 absolute value calculator
169 multiplier
251 first-order lag calculator
252 first-order lag calculator
253 adder-subtractor
254 adder-subtractor
255 high-pass filter
256 high-pass filter
257 multiplier
258 multiplier
259 adder
260 square sum calculator
261 divider
262 proportioner

The invention claimed is:

1. A synchronous machine control device that controls a power converter to which a synchronous machine is connected, the synchronous machine control device comprising:
   a first magnetic flux command calculation unit that calculates a first magnetic flux command value from a current command value of the synchronous machine;
   a magnetic flux estimation unit that estimates a magnetic flux value of the synchronous machine from a current detection value of the synchronous machine;
   a voltage calculation unit that generates a d-axis voltage command value of the power converter such that the first magnetic flux command value matches the magnetic flux value; and
   a damping ratio control unit that generates a correction amount of the d-axis voltage command value based on a vibration component of the magnetic flux value such that the vibration component is damped.

2. The synchronous machine control device according to claim 1, further comprising a second magnetic flux command calculation unit that calculates a second magnetic flux command value such that the first magnetic flux command value matches the magnetic flux value, wherein
   the voltage calculation unit generates the d-axis voltage command value based on the second magnetic flux command value and a speed of the synchronous machine.

3. The synchronous machine control device according to claim 1, wherein a voltage value of the d-axis voltage command value is corrected by using the correction amount.

4. The synchronous machine control device according to claim 1, wherein the damping ratio control unit extracts the vibration component from a difference value between the magnetic flux value and the first magnetic flux command value.

5. The synchronous machine control device according to claim 1, wherein the damping ratio control unit extracts the vibration component from the magnetic flux value.

6. The synchronous machine control device according to claim 1, wherein the damping ratio control unit extracts the vibration component by using a high-pass filter.

7. The synchronous machine control device according to claim 1, wherein the magnetic flux value is a d-axis magnetic flux value.

8. The synchronous machine control device according to claim 1, wherein the magnetic flux value is a q-axis magnetic flux value.

9. The synchronous machine control device according to claim 1, wherein a phase of the d-axis voltage command value is corrected by using the correction amount.

10. The synchronous machine control device according to claim 9, wherein the damping ratio control unit generates the correction amount for correcting the phase of the d-axis voltage command value based on a component in an amplitude direction of the magnetic flux value of the vibration component.

11. The synchronous machine control device according to claim 9, wherein the phase of the d-axis voltage command value is corrected by being rotated according to the correction amount.

12. The synchronous machine control device according to claim 9, wherein the phase is corrected by rotating a control coordinate axis of the d-axis voltage command value according to the correction amount.

13. A synchronous machine control method for controlling a power converter to which a synchronous machine is connected, the method comprising:
   calculating a first magnetic flux command value from a current command value of the synchronous machine;
   estimating a magnetic flux value of the synchronous machine from a current detection value of the synchronous machine;
   generating a d-axis voltage command value for the power converter such that the first magnetic flux command value matches the magnetic flux value; and
   generating a correction amount of the d-axis voltage command value based on a vibration component of the magnetic flux value such that the vibration component is damped.

14. An electric vehicle driven by a synchronous machine, comprising:
   a power converter that is connected to the synchronous machine and supplies power to the synchronous machine; and
   a synchronous machine control device that controls the power converter, wherein
   the synchronous machine control device includes
   a first magnetic flux command calculation unit that calculates a first magnetic flux command value from a current command value of the synchronous machine,
   a magnetic flux estimation unit that estimates a magnetic flux value of the synchronous machine from a current detection value of the synchronous machine,
   a voltage calculation unit that generates a d-axis voltage command value of the power converter such that the first magnetic flux command value matches the magnetic flux value, and
   a damping ratio control unit that generates a correction amount of the d-axis voltage command value based on a vibration component of the magnetic flux value such that the vibration component is damped.

* * * * *